United States Patent [19]

Dedrick

[11] Patent Number: 5,710,884
[45] Date of Patent: Jan. 20, 1998

[54] SYSTEM FOR AUTOMATICALLY UPDATING PERSONAL PROFILE SERVER WITH UPDATES TO ADDITIONAL USER INFORMATION GATHERED FROM MONITORING USER'S ELECTRONIC CONSUMING HABITS GENERATED ON COMPUTER DURING USE

[75] Inventor: Rick Dedrick, Hillsboro, Oreg.

[73] Assignee: Intel Corporation, Santa Clara, Calif.

[21] Appl. No.: 412,707

[22] Filed: Mar. 29, 1995

[51] Int. Cl.$^6$ .................................................. G06F 13/00
[52] U.S. Cl. ........................................................ 395/200.47
[58] Field of Search ............................... 395/828, 830, 395/831, 832, 833, 834, 836, 875, 602, 610, 352, 677, 200.31, 200.33, 200.38, 200.47, 200.48, 200.49, 201, 326

[56] References Cited

U.S. PATENT DOCUMENTS

| | | | |
|---|---|---|---|
| 5,099,422 | 3/1992 | Foresman et al. | 395/201 |
| 5,148,481 | 9/1992 | Abraham et al. | 380/46 |
| 5,305,195 | 4/1994 | Murphy | 395/201 |
| 5,347,632 | 9/1994 | Filepp et al. | 395/200.32 |
| 5,428,785 | 6/1995 | Morel et al. | 395/651 |
| 5,446,891 | 8/1995 | Kaplan et al. | 395/602 |
| 5,483,588 | 1/1996 | Eaton et al. | 379/202 |
| 5,513,126 | 4/1996 | Harkin et al. | 395/200.58 |
| 5,535,321 | 7/1996 | Massaro et al. | 395/337 |
| 5,590,038 | 12/1996 | Pitroda | 395/241 |
| 5,600,781 | 2/1997 | Root et al. | 395/326 |
| 5,617,565 | 4/1997 | Augenbraun et al. | 395/604 |

*Primary Examiner*—Moustafa M. Meky
*Attorney, Agent, or Firm*—Blakely, Sokoloff, Taylor & Zafman

[57] ABSTRACT

A method and an apparatus for storing and updating electronic information in a personal profile server for an individual user, and dynamically changing the residence of the electronic information. The electronic information is being transmitted between a computer and a network system. The computer interfaces with a removable non-volatile storage device containing minimum user information on the individual user. The connection is secured between the computer and the network using the minimum user information. Additional user information is transmitted from the personal profile server of the network to the computer. Further, the personal profile server is updated with updates to the additional user information generated on the computer during use.

19 Claims, 11 Drawing Sheets

SYSTEM FOR AUTOMATICALLY UPDATING PERSONAL PROFILE SERVER WITH UPDATES TO ADDITIONAL USER INFORMATION GATHERED FROM MONITORING USER'S ELECTRONIC CONSUMING HABITS GENERATED ON COMPUTER DURING USE

BACKGROUND OF THE INVENTION

(1) Field of the Invention

The present invention relates to electronic information distribution networks. More particularly, this invention relates to the monitoring of a consumption device, the management of a personal profile database and the changing of the residence of a profile server.

(2) Prior Art

Computer technology is continuously advancing, providing newer computer systems with continuously improved performance. One result of this improved performance is an increased use of computer systems by individuals in a wide variety of business, academic and personal applications. In some instances, these computer systems are linked together by a network or modems so that the systems can communicate with each other via electronic mail.

The current wide-ranging use of computer systems provides a relatively large potential market to providers of electronic content or information. These providers may include, for example, advertisers and other information publishers such as newspaper and magazine publishers. Presently, however, there are no systems which allow electronic information to be customized to the particular characteristics of each individual end user of an electronic information distribution network. Thus, to increase the appeal and effectiveness of electronic information, it would be beneficial to provide a system which customizes the electronic information to the individual end users which will consume the information. By customizing the advertisements to the individual end users, the electronic information will be more appealing to the intended consumers.

In addition, there are presently no systems for generating and transmitting electronic advertisements to end users operating a computer via an end-to-end electronic information distribution network. It would therefore be beneficial to provide a system which would allow an advertiser to generate and transmit electronic advertisements to end users.

Additionally, electronic information providers frequently desire large amounts of information about their markets and potential markets. This information includes, for example, the demographic characteristics of the consumers in a particular market. By obtaining as much information as possible about their potential markets, electronic information providers can direct their electronic information to the markets they believe the information will appeal to most. Individual consumers, however, are frequently concerned with maintaining their privacy. These consumers often do not wish to make certain information, such as their income, publicly available. Thus, it would be advantageous to provide a system which furnishes the electronic information providers with a substantial amount of information about their markets and potential markets, while at the same time maintains individual consumer privacy.

Furthermore, it would be beneficial to provide a system which customizes electronic information to individual end users without specific direction from the users. That is, a system which monitors the actions taken by an individual user in consuming electronic information and customizes subsequent units of electronic information for that individual user based on these previous actions.

Additionally, it would be desirable for these beneficial features to be implemented by an affordable solution. Such solution may be centered on a smart card which is a less costly alternative as compared to other potential implementations such ones made through PCMCI based multi-megabyte flash memory card which are more expensive.

The present invention provides for these and other advantageous results.

BRIEF SUMMARY OF THE INVENTION

A method and an apparatus for storing and updating electronic information in a personal profile server for an individual user, and dynamically changing the residence of the electronic information. The electonic information is being transmitted between a computer and a network system. The computer interfaces with a removable non-volatile storage device containing minimum user information on the individual user. The connection is secured between the computer and the network using the minimum user information. Additional user information is transmitted from the personal profile server of the network to the computer. Further, the personal profile server is updated with updates to the additional user information generated on the computer during use.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF THE INVENTION

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Figure 1:
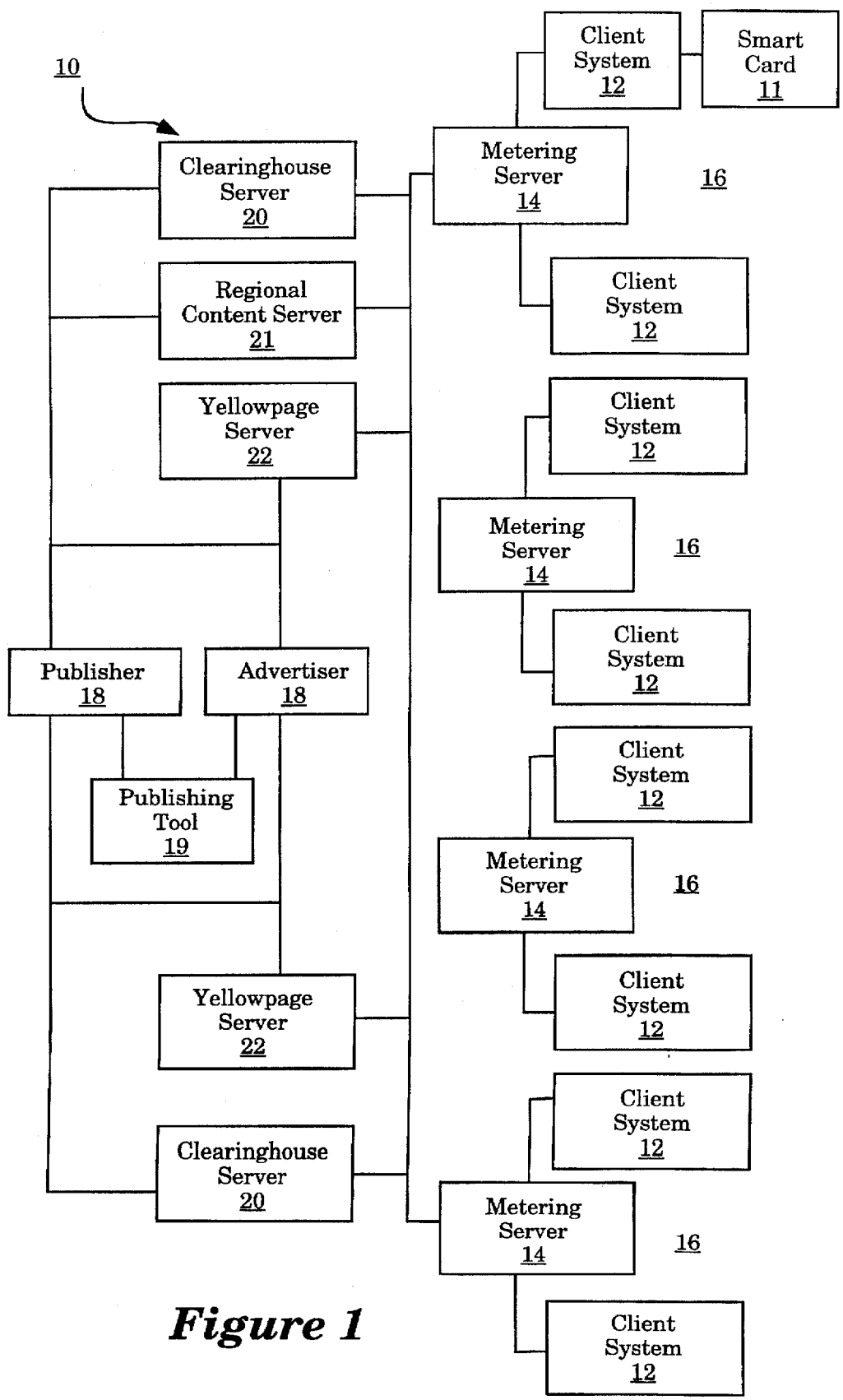
FIG. 1 is a schematic of a network of one embodiment of the present invention.

FIG. 1 shows a network system 10 of one embodiment of the present invention. The network 10 includes a plurality of client systems 12 coupled to a metering server 14 within a local area network (LAN) 16. Alternatively, a single client system 12 may be coupled to a metering server 14. Each client system 12 may be a personal computer that is operated by an end user which may be coupled to a smart card 11. Alternatively, each client system 12 may be any other type of consumer consumption device, such as a television set, a cable settop converter, a game machine, etc. The server 14 is typically a dedicated computer that provides an interconnect contact node which allows the client systems 12 to communicate with the server 14 and other client systems 12. The server 14 may contain resident modem sharing software that allows the server 14 and client systems 12 to communicate with a device external to the local network 16. The server 14 is also capable of maintaining resident databases. Both the server 14 and the client systems 12 contain the necessary interface hardware and software required to transfer information between the components of the system 10.

The metering server 14 is coupled to a publisher unit 18 through a plurality of clearinghouse servers 20. By way of example, the publisher 18 may be connected to the server 14 as part of an overall wide area network (WAN) that allows the server 14 and publisher unit 18 to transfer information. The system 10 may also have a yellow page server 22 coupled to the publisher unit 18 and the metering servers 14. The publisher unit and servers of the WAN system contain the interface hardware and software necessary to transfer electronic information between the components of the system. As shown in FIG. 1, the system 10 may have multiple client systems 12 coupled to a single metering server 14 and multiple servers 14 coupled to a single clearinghouse server 20, a regional content database server 21 and a single yellow page server 22. There may be multiple clearinghouse and yellow page servers located at regional centers throughout the country/world. In addition, depending on the size of a community, there may also be multiple yellow page servers for each local community. Although the computer 18 is referred to as a publishing unit, it is to be understood that the computer can also be a node for an advertiser 18 and that the use of the terms publisher and advertiser may be synonymous.

Each client system 12 is provided with an interface, such as a graphic user interface (GUI), that allows the end user to participate in the system 10. The GUI contains fields that receive or correspond to inputs entered by the end user. The fields may include the user's name and possibly a password. The GUI may also have hidden fields relating to "consumer variables." Consumer variables refer to demographic, psychographic and other profile information. Demographic information refers to the vital statistics of individuals, such as age, sex, income and marital status. Psychographic information refers to the lifestyle and behavioral characteristics of individuals, such as likes and dislikes, color preferences and personality traits that show consumer behavioral characteristics. Thus, the consumer variables refer to information such as marital status, color preferences, favorite sizes and shapes, preferred learning modes, employer, job title, mailing address, phone number, personal and business areas of interest, the willingness to participate in a survey, along with various lifestyle information. This information will be referred to as user profile data, and is stored on a consumer-owned portable profile device such as a Flash memory-based PCMCIA pluggable card. The end user initially enters the requested data and the non-identifying information is copied to the metering server 14. That is, the information associated with the end user is compiled and copied to the metering server 14 without any indication of the identity of the user (for example, the name and phone number are not included in the computation). The GUI also allows the user to receive inquiries, request information and consume information by viewing, storing, printing, etc. The client system may also be provided with tools to create content, advertisements, etc. in the same manner as a publisher/advertiser.

All of the fields in the GUI relating to consumer variables are hidden from the consumer. The display of the GUI is based upon these fields, but the GUI does not display them to the user except when the user brings up a "profile editor", as discussed in more detail below. Thus, the monitoring of consumer actions and inaction based on these consumer variables and the updating of user profile data is transparent to the consumer. In addition, modifications made to the electronic information to customize it to a particular consumer are also transparent to the consumer.

The publisher/advertiser 18 is provided with software tools to create electronic information which includes content and advertisements that can be transmitted over the system. The electronic information may allow an end user to access a content database, or the information may be all or a portion of a content database. By way of example, the content database may be the text and video of an electronic newspaper. The content database may reside within the publisher unit or be located at a remote location such as the metering server or a regional server that services a plurality of metering servers. The software tools may include a hypertext oriented mark up language that routes distributed end users to the content databases.

In one embodiment, the software tools provided to the publisher/advertiser 18 include software tools for embedding consumer variables within the electronic information. The embedded consumer variables enable a client activity monitor and a consumption device to monitor consumer interaction with the electronic information based on the consumer's interaction with the unit of information currently being consumed. This interaction includes both inputs by the consumer and actions which the consumer could have taken but chose not to. In one implementation, the publisher/advertiser 18 is provided with a GUI which allows the publisher/advertiser 18 to select certain consumer variables from a set of consumer variables and associate the selected variables with specific objects or fields within the electronic information. For example, the electronic information may include several option fields from which end users may select. The publisher/advertiser 18 may associate a color preference variable with these option fields, thereby indicating to the client systems 12 to track the color of the option field selected by the end user.

The publisher/advertiser 18 is also provided with software tools to create electronic information in a wide variety of consumption formats that can be transmitted over the system. These consumption formats include formats such as audio, video, graphics, animation, text, etc. For example, an advertiser 18 may create an advertisement for a camera which describes the camera in both audio and video format. Both of these consumption formats are transferred to yellow page servers 14, and subsequently to the client systems 12. The end user is then able to consume the advertisement in whichever format he or she prefers, or alternatively in both formats.

In one embodiment, each piece of electronic information received by client system 12 includes a header block which includes the consumer variables and their related objects or fields for that piece of electronic information. For example, the header block of the given piece of electronic information may include a quality parameter and a cost parameter indicating the minimum quality the electronic information must be delivered at the designated cost. Such information may be input by the publisher/advertiser 18 at the authoring site of the electronic information. The header block of a given piece of electronic information may also include an indicator that a color preference variable is associated with certain option fields. In addition, default colors for particular fields or objects, or a default consumption format, such as audio or video, for the electronic information may also be included in the header block.

Figure 2:
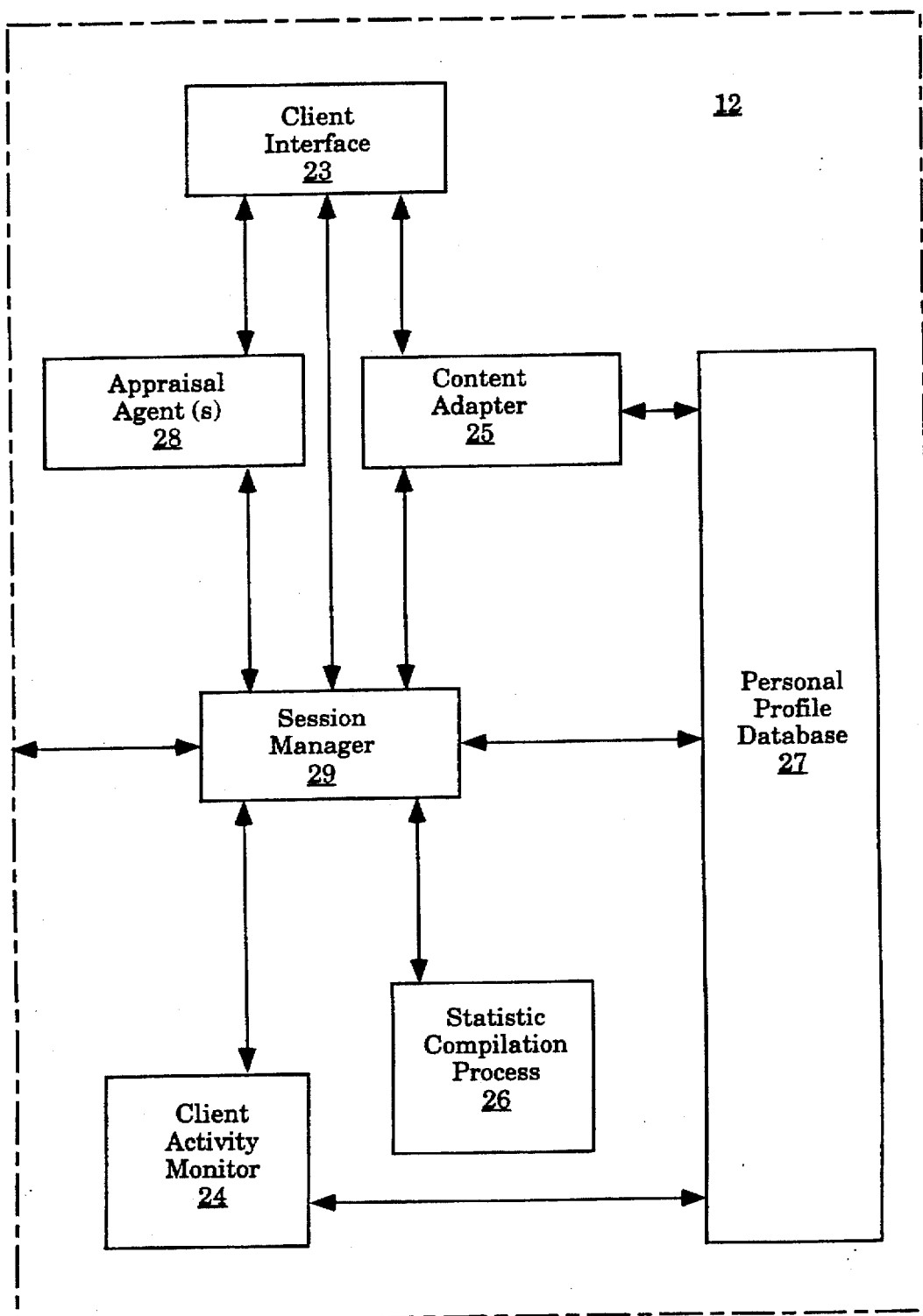
FIG. 2 is a schematic of a client system in one embodiment of the present invention.

As shown in FIG. 2, each client system 12 includes a session manager 29, a client interface 23, a client activity monitor 24, a content adapter 25, a statistic compilation process 26, and a personal profile database 27. The client interface 23 provides individual users with access to the system 10. Interface 23 may be any of a wide variety of user interaction devices. For example, the client interface 23 may be the display device and input device of a personal computer based on an Intel® microprocessor architecture. Alternatively, the client interface 23 may be a display and input device coupled to, or part of, any of a wide variety of consumer consumption devices, such as a television set or a game machine. In one embodiment, the client interface 23 is a physical device which is separate from the remainder of client system 12. For example, client interface 23 may be a personal computer system, while the remaining components of client system 12 are contained in a separate box or similar physical device coupled to the personal computer system. Interface 23 supports any one or more of a wide variety of conventional input methods, including alphanumeric keyboard inputs, voice inputs, cursor control inputs (such as a mouse or trackball), touch screen inputs, etc.

Session manager 29 transfers data and control information to and from the components of client system 12, and acts as an interface between client system 12 and metering server 14. Electronic information which is transferred to client system 12 is received by session manager 29 and forwarded to client interface 23. In one embodiment, the electronic information is forwarded to client interface 23 via content adapter 25. Content adapter 25 may then modify the electronic information, based on the end user's data stored in personal profile database 27. Session manager 29 also instructs statistic compilation process 26 to compile the aggregate data stored in personal profile database 27 when the information is requested by metering server 14.

The client activity monitor 24 tracks the consumer variables corresponding to the preferences of the end user(s) of client system 12. When an end user consumes electronic information, and also possibly interacts with that electronic information, client activity monitor 24 associates the electronic information with the appropriate consumer variables and stores this data in the personal profile database 27. For example, the client activity monitor 24 tracks the color of fields or objects that are selected most frequently and least frequently by the end user. Similarly, the consumption format chosen most frequently and least frequently by the end user, such as audio or video, is also tracked and stored in personal profile database 27. In one embodiment, the consumer variables and corresponding fields or objects are indicated in a header block received with the electronic information.

The personal profile database 27 maintains the user profile data for the end user(s) of client system 12. For example, age, gender, income, marital status, color preferences, etc. are stored in personal profile database 27 for each individual end user of client system 12. In addition, personal profile database 27 may also include additional information such as credit card numbers, social security numbers, mailing addresses, preferred shipping methods, etc. for each individual end user to facilitate ordering items displayed in advertisements.

Personal profile database 27 is updated with consumer variable information based on the activity monitored by client activity monitor 24. In one embodiment, this information can also be directly modified by the end user. For example, client interface 23 may include the ability to access the user profile data for a particular end user which is stored in personal profile database 27, such as through a GUI profile editor. The end user is then able to alter this data, which is then returned to metering server 14 (via statistic compilation process 26 discussed below), and used by content adapter 25 discussed below.

In one embodiment, the information in personal profile database 27 is protected from access by anyone other than the individual who is associated with the information. For example, the information may be protected on a computer by encrypting the profile when it is not in use. Alternatively, the information may be stored on a removable nonvolatile storage device, such as a PCMCIA Flash memory card. Thus, an individual may remove the Flash-based profile card from a computer and thereby remove the risk of exposure of private information to other individuals operating in the network system 10. In addition, since the profile is removable, individual end users can move a profile from computer to computer, such as between office and home.

In yet another embodiment, a portion of the user and profile information may be stored on a removable nonvolatile storage device, such as a smart card. Although the smart card has limited storage space, it is a much more inexpensive alternative as compared to a PCMCIA flash memory card. Minimum user information such as user name, address, telephone number and user password may be stored in the smart card. Other user profile information may be retrieved from a user profile server upon access by a user via the smart card. The accessed user profile information may then be transmitted back to the computer in an encrypted form and stored the PC's volatile memory. Any user profile information which has been changed by the user may be transmitted back to the network system 10 and the personal profile may then be updated with the new information.

Another field which may be stored within the removable smart card is an update interval field. This is a user configurable field. The user personal profile is continuously kept up to date at each interval indicated by the update interval field. When the user is ready to close the connection, a final transmission is made to the user profile server in the network system 10 with the updated information.

All of the information stored on the removable personal profile storage device is also encrypted. To access the consumer profile, the consumer inserts the card into the client system 12, which prompts the consumer for a personal identification number (PIN) or password. Upon receiving the correct PIN, the client system 12 decrypts the profile information in the storage device and stores the decrypted profile information in the client system's volatile memory. The consumer is then able to utilize the profile (transparently). The profile in volatile memory is re-encrypted periodically and stored back to the storage device. When the consumer finishes using the client system 12, the final profile revision is encrypted and stored in the storage device. The card is then ejected from the client system 12 and pocketed by the consumer, and the un-encrypted profile information in the volatile memory is overwritten and wiped.

The content adapter 25 customizes electronic content to the individual end user based on the user profile data contained in personal profile database 27. Electronic content received by system 12 from metering server 14 may include fields which can be customized. Which fields can be customized may be indicated in a header block received with the electronic content. For example, a unit of electronic information may be received with a particular field having the default color of green. If personal profile database 27 contains sufficient data regarding color preferences for the individual end user, then content adapter 25 changes the color of that particular field from green to whatever color preference is contained in personal profile database 27 for that individual end user. Similarly, the default consumption format may be video, but if personal profile database 27 indicates that the end user prefers audio format, then content adapter 25 delivers the audio format version of the electronic information to the client interface 23 rather than the video version.

Data is collected for personal profile database 27 by direct input from the end user and also by client activity monitor 24 monitoring the end user's activity. When the end user consumes a piece of electronic information, each variable (or a portion of each variable) within the header block for that piece of electronic information is added to the database for this end user. For example, if this piece of electronic information is made available to the end user for consumption in both audio and video format, and the end user selects the audio format, then this choice of format selection is stored in personal profile database 27 for this end user.

When sufficient data has been collected for a particular consumer variable, then content adapter 25 uses that data to customize received electronic content to the end user. The amount of data which is sufficient is dependent on the particular consumer variable. For example, once personal profile database 27 has collected ten consumption format selections from this end user and all ten have been for video format, content adapter 25 may determine that this is sufficient data to customize incoming electronic information. However, content adapter 25 may determine that sufficient data has not been collected to customize colors if this end user has selected ten different fields, six of which were purple and four of which were green.

In one embodiment of the present invention, the end user is able to override any compiled user profile data. For example, even though the end user may select a field with the color purple most frequently, the end user is able to modify the user profile data to indicate that green is the preferred color. In one implementation, the statistic compilation process 26 uses this input by the end user for its data compilation. Alternatively, the statistic compilation process 26 may use the data collected by client activity monitor 24 for its data compilation, or the statistic compilation process 26 may utilize both the end user and the data collected by client activity monitor 24.

Statistic compilation process 26 compiles the user profile data contained in personal profile database 27 and transfers the compiled data to metering server 14. Statistic compilation process 26 aggregates the user profile data in personal profile database 27. That is, statistic compilation process 26 compiles all of the user profile data in personal profile database 27 except for information which identifies a particular individual. For example, information such as the end user's name, social security number, address and credit card numbers are not included in the compilation. Thus, client system 12 transfers the compiled data to metering server (where data from multiple consumers is aggregated and then forwarded to the clearinghouses) 14 without divulging any personal identification information to the advertisers/publishers.

It should be noted that, under certain circumstances, identifying information such as a name and credit card number may be provided to the publisher/advertiser. For example, an advertisement for a camera received by the end user may have a "buy" option associated with it. If the end user selects the buy option, then session manager 29, transfers the end user's name, credit card number, and address to the advertiser. Given this information, the advertiser is able to charge the purchase price of the camera to the end user's credit card and ship the camera to the end user.

In one embodiment, client interface 23 provides the end user with access to personal profile database 27 which allows the end user to select certain criteria to be omitted from the compilation process. For example, an end user may select to omit details such as color preferences, income, marital status, age, gender, etc. Alternatively, for demographic information, the user may not initially provide certain information to the personal profile database 27, thereby preventing its inclusion in the compilation.

In one embodiment of the present invention, statistic compilation process 26 compiles electronic content-specific information for return to the metering server 14. This information includes, for example, how much time the end user spent consuming the electronic content, and how much of the content was consumed. For example, a particular advertisement may include ten different screens which are displayed to the end user. If the end user spends 15 seconds viewing the first screen and 15 seconds viewing the second screen and then terminates the advertisement, the statistic compilation process 26 transfers information to the metering server 14 indicating that an individual with this end user's user profile data spent 30 seconds viewing the electronic information and that the content was 20 percent consumed (that is, two screens out of ten were consumed). Additionally, information indicating the specific elements of the advertisement that were consumed (that is, the first two screens in this example) is also transferred to the advertiser. Note that, as discussed above, this aggregate information does not reveal the identity of the end user who consumed the advertisement.

In one embodiment of the present invention, the client system 12 also includes an appraisal agent(s) 28. The appraisal agent 28 provides the end user with an agent which can search various yellow page servers 22 to locate electronic content which matches the end user's user profile data. For example, the end user may desire to view five different electronic advertisements per day. The appraisal agent 28 accesses the user profile data for the end user from the personal profile database 27 to determine the search criteria for this end user, and then proceeds to work its way back through the system 10 to locate electronic information which matches the search criteria. In one implementation, the number of electronic advertisements a user desires to view per day is included in personal profile database 27. In one embodiment, multiple appraisal agents 28 may be initiated by a single end user, with each appraisal agent 28 performing a different search.

Alternatively, the appraisal agent 28 may be programmed by the end user to locate a particular item. For example, the end user may program the appraisal agent 28 to locate, and possibly purchase, a camera. The end user would define the search criteria for the appraisal agent 28 to find an advertisement(s) for a camera which meets the end user's needs, such as a particular brand, features, price, etc. Once located, the advertisement is returned to the end user. Alternatively, the appraisal agent 28 may be programmed to purchase a camera once one is found which matches the search criteria.

The appraisal agent 28 searches for information by making requests to the yellow page servers 22. These requests include the search criteria and are received by the session manager 78 of the yellow page server 22. Then, via the interactive process 76, session manager 78 accesses the advertising database 70 in an attempt to locate electronic information which matches the search criteria.

The appraisal agent may access multiple "levels" of yellow page servers 22 in order to match the search criteria. For example, the appraisal agent 28 may first access a local yellow page server 22 in an attempt to match the search criteria. If the search fails at the local level, the appraisal agent 28 may then access a regional yellow page server 22, and if that search is unacceptable, access a national yellow page server 22, etc.

When requesting electronic advertisements, the data returned to the end user is dependent on the end user's request. For example, the end user may define certain results which should occur based on how well the electronic information matches the search criteria. The appraisal agent 28 may electronic ed to return the title of the electronic advertisement if it is only a 5% match to the search criteria, an abstract if it is a 25% match to the search criteria, and the entire advertisement if it is a 95% match to the search criteria. Alternatively, the appraisal agent 28 may be programmed to return only titles, regardless of how well the advertisements match. In addition, the appraisal agent 28 may know, based on the user profile data stored in personal profile database 27, that the end user only wants to consume five electronic advertisements per day. The appraisal agent may then return titles of 25 electronic advertisements to the end user, and allow the end user to select which advertisements he or she will consume.

In addition to receiving electronic information in the form of advertisements, the end user of client system 12 may also receive other electronic information, such as electronic content placed in clearinghouse servers 20 by publisher 18. For example, this electronic content may be a newspaper or magazine article, or an encyclopedia entry. In one embodiment, this electronic content contains the same consumer variable information in header blocks as the electronic advertisements, and is customized by client system 12 in the same manner as discussed above.

Figure 3A:
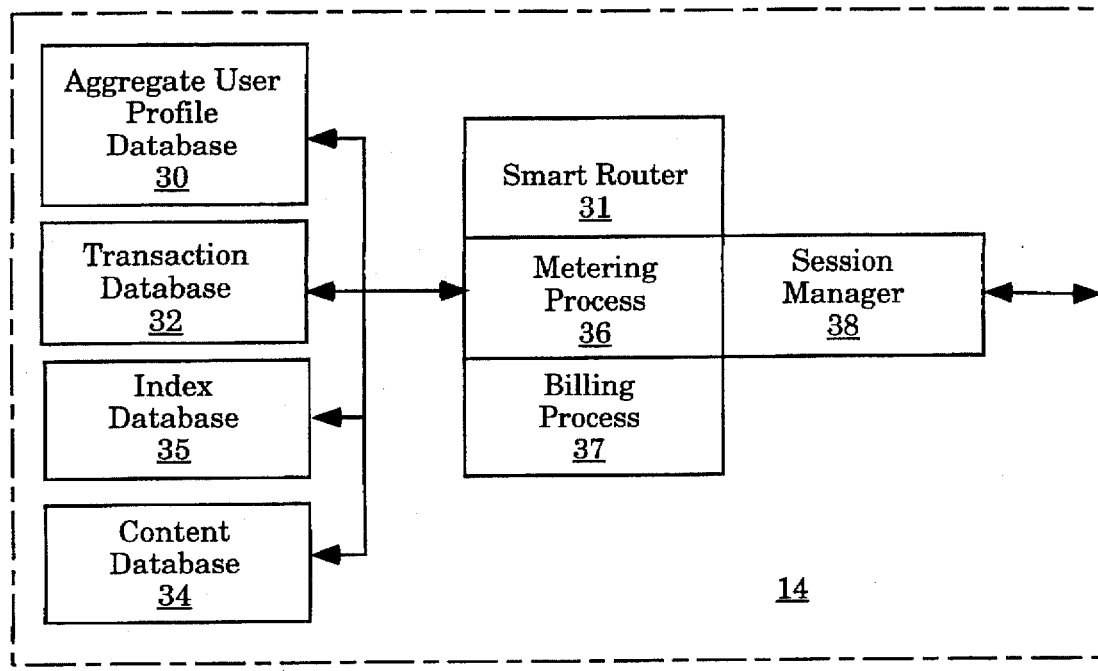
FIGS. 3a and 3b are schematic of a metering server in one embodiment of the present invention.

As shown in FIG. 3a, resident within each metering server 14 is a user profile database 30, a transaction database 32, a content database 34 and an index database 35. The user profile database 30 contains aggregate profile data for the consumption devices served by the metering server 14 which is collected from the client systems 12, along with subscriber information. In one embodiment, the metering server 14 periodically requests the user profile data stored in the client systems 12.

The transaction database 32 contains the end user's account along with a log of the transaction, including the price of the transaction. The transaction database 32 may also contain the balance and a credit limit for each end user account. The content database 34 contains units of electronic information. The index database 35 contains titles for each electronic information unit. In one embodiment, the metering servers 14 also have access to a regional content database server(s) 21 which contains a larger content database.

Thus, the metering server 14 contains an account balance, a user identification (such as an account number or a name), and may also include information indicating which information the user subscribes to. User profile data requested by metering server 14 from the client systems 12 is stored in user profile database 30, along with user profile data corresponding to electronic information being consumed by an end user. As discussed above, this user profile data does not specifically identify the individual end user. The account balance and user identification is contained in the transaction database 32. Therefore, the only information which is contained in the metering server which identifies an individual end user is that user's identification and an account balance, thereby maintaining the user's privacy.

In one embodiment, the transaction database 32 also includes, in the log of a transaction, an indicator of the electronic information consumed. By maintaining such a log, the metering server 14 is able to summarize an end user's consumption for that user's review. For example, the metering server 14 may generate a monthly statement summarizing how much money the end user spent consuming electronic information.

Each metering server 14 also contains a metering process 36, a billing process 37 and a session manager 38. The metering and billing processes 36 and 37 access and process information in response to instructions from the session manager 38. For example, when an end user requests a unit of information, the request is received by the session manager 38. The session manager 38 instructs the metering process 36 to retrieve the requested unit of information. In one embodiment, the metering process 36 then initially accesses the user profile database 30 to determine whether the end user is a subscriber of the information. If the end user is a subscriber, the metering process 36 retrieves the unit of requested information from the content database 34, wherein the information can be transmitted to the end user.

If the end user is not a subscriber, the metering process 36 calculates the price of the requested information and accesses the transaction database to subtract the price from the balance of the end user's account. The balance is initially established when the end user requests an account in the system. The balance may be specified by the end user and approved by the clearinghouse server. Approval may be based upon a credit card number or bank account number provided by the end user. The balance may be updated by the clearinghouse server when the end user pays his bill. If the balance minus price is greater than zero, the metering process 36 retrieves the information and sends the same to the end user. If the balance minus price is less than zero, the metering process 36 does not retrieve the information and may send a message to the end user that the balance has been exceeded. The initial balance of the account is typically set by a credit limit.

In one embodiment, requests for information are made by the appraisal agent 28. In this embodiment, the metering process 36 checks whether the content database 34 contains information matching the search criteria provided by appraisal agent 28. If a match exists, then electronic information is returned to the client system 12, provided the end user which initiated appraisal agent 28 is a subscriber of the information, or has a sufficient balance in his or her account to pay for the electronic information.

By way of another example, a clearinghouse server 20 may request billing information from the metering server 14 about the end users, or a specific end user. The session manager 38 receives the request and instructs the billing process 37 to retrieve the information. The billing process 37 then retrieves the billing information from the transaction database 32 and transfers the information to the clearinghouse server 20. The clearinghouse server 20 may also request user profile data, wherein the billing process 37 retrieves the profile data from the user profile database 30. Additionally, the information may be targeted to end users with specific profiles. Upon receiving and storing the targeted information in the content database 34, the metering process 36 accesses the user profile database 30 to find end users with matching profiles. The metering process 36 then sends the content titles to the end users with matching profiles.

In one embodiment, the software tools also provide an interactivity builder to allow the end user to interact with the electronic information. For example, the electronic information may be a content database that is analogous to the "yellow pages" of a phone book. The yellow page content database may contain a plurality of advertisements that can be viewed by the end user. The software tools may allow the publisher to build an object that allows the end user to search the contents of the content database. The software tools may also allow the publisher/advertiser to combine different types of information. For example, the publisher can combine video, audio, graphics, animation and text all within the same unit of electronic information provided to the end user.

The software tools include "cost type" and "cost value" fields that accompany each unit of electronic information. The cost type and cost value can be utilized to calculate a price that can be either credited to or debited from the end users. The fields allow the publisher/advertiser 18 to establish the manner in which the information will be charged to the end user's account. One example of a cost type is "pay per view" payment method, wherein the end user pays an associated cost each time the user consumes a unit of information. This cost may also be proportional to the amount consumed, so that the cost is higher for consuming the entire unit information rather than a smaller portion, such as the abstract. This type of payment may be desirable for information which is typically seldom consumed by the end user. Other cost types include payment on a per byte or word of information viewed by the end user, or payment for the period of time that the user consumes the information. These cost types may be desirable when the end user is accessing a database that contains, for example, corporate or individual credit information, or the drawings and text of a patent database.

The user may also subscribe to units of information, either individually, or through a group such as the employer of the end user. For example, the end user may wish to subscribe to a news database that provides the end user news information upon command for a monthly, yearly, etc. charge. The cost types may also include a one-time charge for a unit of information, wherein the end user is granted access to the unit of information for the life of the unit.

The cost types may be provided as part of a menu that can be selected by the publisher. For example, the menu may appear to the publisher as follows:

---

"Pay Per View"
"Pay Per Byte"
"Pay Per Time"
". . ."

---

The cost value is provided in a different field and may be embodied by a simple data entry by the publisher. For example, if the pay per view cost type is selected, the publisher may enter "$1.00". If the pay per byte cost type is selected, the publisher may enter "$0.10 per Mbyte", and so forth and so on. The tools may also allow the publisher to associate a plurality of cost types and corresponding cost values with the same content of information.

In addition to debit models, the software tools may also allow the publisher/advertiser 18 to build a credit model which credits the end user's account each time the user views a unit of information. This model is particularly useful for advertisers who may want to credit the end user's account to encourage the user to consume an advertisement. By way of example, the credit model can be used in association with the yellow pages content database. The publisher/advertiser may also be provided with a field that allows the publisher/advertiser to select between credit and debit.

In one embodiment, the software tools allow the publisher/advertiser 18 to request certain profile data associated with the consumption of a unit of information. For example, associated with a unit of information may be a request to provide the publisher/advertiser with certain user profile data such as the age or income of the viewers who viewed the information. Additionally, the tools may also allow the publisher to request that the unit of information be directed only to end users that have a certain profile. For example, the publisher/advertiser may request that a unit of information be directed only to male end users or end users that have historically viewed news items. The target user profile may be associated with a pricing hierarchy for advertising information, such that a targeted end user receives a larger price credit than an end user that was not targeted by the advertiser.

The publisher/advertiser is also provided with an account number so that the charges associated with the consumption of information provided by the publisher/advertiser is charged to the account number of the publisher/advertiser. For example, a publisher may provide a unit of information which is subsequently consumed by the end user. The charge incurred by the end user is then debited against the user's account and credited to the publisher's account. By way of another example, the end user may view an advertisement, wherein the charge associated with the unit of information viewed is credited to the end user's account and debited to the advertiser's account.

The metering server 14 also includes a smart electronic information transport router (smart router) 31. The smart router 31 when connected to multiple parallel bandwidth diverse transport channels, correctly transmits electronic information over the lowest cost transport channel containing enough free bandwidth to provide "high quality" transmission of the electronic information.

The information publishers 18 are the source end point and the set of consumers 12 of the electronic information are the destination end point of the end to end electronic information storage and distribution network illustrated in FIG. 1. A series of interconnected networks including a variety of bandwidth diverse transport mechanisms such as a modem based POTS, ISDN, coaxial cable, fiber optic cable and phone lines, satellite dishes and microwave links, etc., are responsible for connecting the end points. Each of these transport mechanisms has their own bandwidth and transmission cost characteristics. Consumers who have more than one of these transport mechanisms connected to their consumption devices (client systems 12 in FIG. 1), may benefit from using the lowest cost transport mechanism which provides the channel specific acceptable delivery data rate.

The smart router 31 routes the electronic information over the available transport mechanism based upon the minimum and maximum bandwidth (through-put data rate) required by each object in the electronic information at the absolute lowest cost to the publisher/author.

In one embodiment, the content database 34 also contains cost and minimum and maximum bandwidth requirement parameters associated with each media types in the electronic information being transmitted. These costs and bandwidth requirement parameters are taken by the smart router 31 to route the different media types of the object through the transport mechanism which produces the best fit in terms of the given cost and bandwidth requirements. For example, a textual object may be routed from the yellow page server 22 to client system 12 through metering server 14 through a telephone line. A digital video object in the same electronic information which is an attribute of the textual object may be routed from the yellow page server 22 to the client system 12 to the metering server 14 over a local cable transport mechanism.

In one embodiment, the publisher/advertiser 18 of the electronic information may label the content which they create through the bandwidth requirement and cost parameters of the header block of the electronic information. Thus, at the authoring site, the publisher/advertiser 18 inserts the desired minimum and maximum bandwidth and the amount the publisher/advertiser is willing to pay for those transport mechanisms. A person skilled in the art may take standard authoring tools such as Microsoft Viewer®, Macromedia Director®, or Macromedia Authorware®, and add software extensions to them such that a publisher/advertiser 18 utilizing such publishing tools may insert cost and bandwidth requirement parameters in the header block of the electronic information through user input via keyboard on an input screen of a PC running the publishing tool. Each field may then be inserted into a header block that is associated with that multimedia element. The electronic information may then be downloaded through the network through the yellow page server 22. The metering server 14 holds the bandwidth and delivery cost parameters regarding the relevant pieces of content. When the server requests the content to be delivered, the smart router 31 looks at the labels associated with each of the multimedia pieces of content as designated through the requirement and cost parameters of the header block of the electronic information, and determines which electronic information needs to be delivered at what quality and at what cost for the delivery.

The smart router 31 then looks at the variety of links between the metering server 14 and the consumption device 12. If there are multiple links available, the smart router 31 takes advantage of the link which best matches the associated label that the author inserted in the header block of the electronic information. If there is only one link, then that link is used to transport the electronic information. If there are multiple links available, a best fit algorithm is used to match the quality and cost parameters designated.

In one embodiment, if the desired communication link becomes unavailable, the communication channels are switched. For example, if the electronic information stops flowing and time-out errors are received, either the metering server 14 may retransmit the electronic information, or in the alternative, the consumption device 12 may send the metering server 14 requests for retransmission of the electronic information.

Figure 3B:
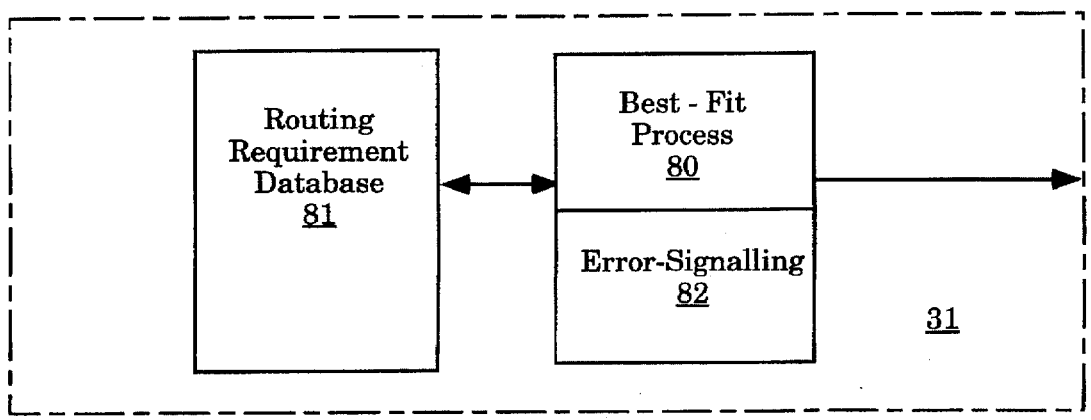

As shown in FIG. 3b, in one embodiment, the smart router module 31 contains a best fit process 80 coupled to a routing requirement database 81. The minimum and maximum bandwidth requirements and cost of delivery parameters taking from the content database 34 in metering server 14 is stored in routing requirement database 81. The best fit process 80 retrieves the minimum and maximum bandwidth requirements and cost of delivery parameters, looks at the available channel links connecting the metering server 14 and the consumer consumption device 12 and selects the channel link which best accommodates the minimum and maximum bandwidth requirement and the cost of delivery associated with each unit of content to be transmitted.

Figure 4:
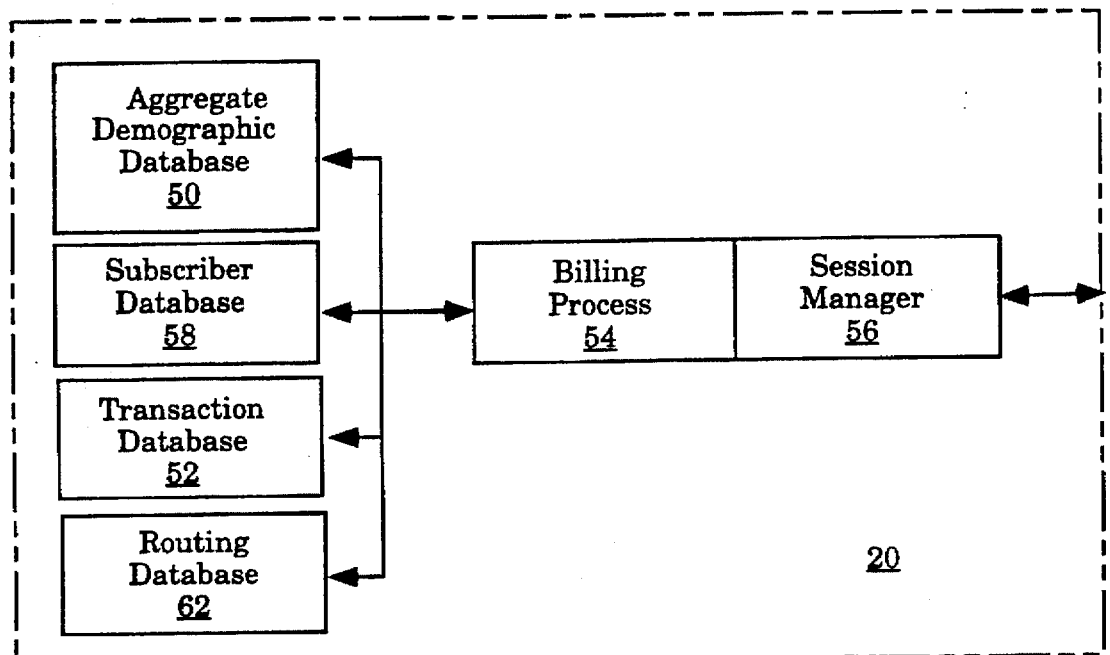
FIG. 4 is a schematic of a clearinghouse server in one embodiment of the present invention.

As shown in FIG. 4, each clearinghouse server 20 contains a demographic database 50, a transaction database 52, billing process 54 and a session manager 56. The demographic database 50 contains user profile data collected from the metering servers 14. The transaction database 52 contains billing information relating to the end users. The transaction database 52 also contains data relating to the accounts of the publishers/advertisers 18. The billing process 54 can access and process data within the databases 50 and 52. For example, when an end user consumes a unit of electronic information, data relating to the consumption of the electronic information may be sent from the billing server 14 to the clearinghouse server 20. The session manager 56 instructs the billing process 54 to charge the publisher/advertiser account within the transaction database 52. The clearinghouse server 20 may also receive user profile data from the metering servers 14 which is subsequently stored by the billing process 54 in the demographic database 50.

In one embodiment, the billing process 54 also provides the publisher/advertiser 18 with requested user profile data. For example, the publisher/advertiser may send a unit of information along with a request for certain user profile data of the end users who view the information. The clearinghouse server 20 compiles the user profile data of the end users who view the information and forward the compiled user profile data to the publisher.

The billing process 54 of the clearinghouse server can also direct a unit of electronic information to metering servers that service end users with a profile that correlates to a targeted user profile characteristic. For example, the publisher may request that a unit of electronic information be directed to end users with a certain income, etc. The demographic database 50 may contain data relating to which metering servers 14 service end users with corresponding user profile characteristics. The clearinghouse server 20 correlates the requested user profile data with certain identified metering servers and sends the unit of electronic information only to the selected metering servers, which then forward the electronic information to the end users. The clearinghouse server may also have a subscriber database 58 that contains a list of all the metering servers and whether a subscribing end user is associated with the metering server. If the electronic information provided by the publisher is for subscribers, the billing process 54 accesses the subscriber database 58 and provides the information to metering servers that have corresponding subscribers.

The clearinghouse server 20 correlates the user profile data of an end user with a metering server without specifically "knowing" the identity of the end user. This feature increases the privacy of the end user so that an external entity cannot find out the type or content of information being viewed by a specific end user. The clearinghouse server 20 and metering server 14 may also contain access control security features which prevent an illegal access of the databases that reside within the server.

In one embodiment, the billing process 54 also generates bills for the end users and the publishers/advertisers. Upon a request from the publisher/advertiser, the session manager 56 instructs the billing process 54 to generate a bill. The billing process 54 retrieves the billing information from the transaction database 52 and generates a bill. The bill may be electronically transferred to the end user or sent through a conventional mail service. The billing process 54 may also generate bills that are transmitted to the publishers/advertisers. The bill may be generated periodically in accordance with header information that accompanies the content that is generated by a publisher/advertiser. Alternatively, the clearinghouse server 20 may utilize consumer credit cards and/or bank accounts for billing. For example, amounts owed by the consumer for consumption of electronic content and amounts due the consumer for consumption of electronic advertisements may be charged or credited, respectively, to the consumer's credit card or bank account.

In one embodiment, the clearinghouse server may contain a routing database 62 that contains indexes for access to databases external to the system. The routing database 62 is used to direct access requests to remote databases that do not reside in the metering servers 14.

The clearinghouse server 20 can also credit or debit the publisher/advertiser account for electronic information sent by another publisher/advertiser. For example, advertising information generated by an advertiser and viewed by an end user can be credited to the account of a publisher if the advertising information is associated with electronic information provided by the publisher. By way of example, the clearinghouse server 20 can replace the conventional billing system between advertisers and publishers that is present in traditional newspaper advertising.

The metering server 14 is capable of storing units of information relating to the content databases of the publisher/advertiser, including the entire content database. The publisher may periodically update the contents of the database. The content may be initially transferred from the publisher/advertiser 18 to the clearinghouse server 20, which retransmits the content to regional 21 and metering 14 servers. The content received by the metering server 14 from the publisher may include content titles that summarily describe the contents and are stored in the index databases 35 of the metering servers 14. The metering server 14 transmits the titles and possibly a portion of the content to the client systems 12. If the end user wants to consume the electronic information, the user generates a request for the electronic information, typically by providing an input to the GUI of the client system 12. The metering server 14 receives the request and sends the information in accordance with the metering methodology of the system. In addition, requests for electronic information may also be made through the appraisal agent 28 of client system 12.

When an end user requests electronic information, such as via an appraisal agent 28, the metering server 14 calculates the price of consuming the electronic information from the cost type and the cost value associated with the information. By way of example, the metering process 36 subtracts the price from the account balance and then determines whether the result is greater than zero. If the price of consuming the electronic information does not exceed the balance, the metering server 14 sends the unit of electronic information to the end user. If the price does exceed the balance, the metering server 14 does not send the electronic information to the end user and may inform the end user of the remaining balance. If the cost type associated with the information is per time or per byte/word, the metering server may periodically determine if the balance is being exceeded by the consumption of information. The metering server may terminate the transmission of information if the price of the information exceeds the balance. The metering server 14 may also periodically transfer the balance, the charges and the associated billing information of the end user to the clearinghouse server 20 for billing.

In one embodiment, the metering server 14 also transfers requested aggregated user profile information to the clearinghouse server 20. For example, the publisher 18 may transfer a unit of information to the metering server 14 via the clearinghouse server 20, along with a request to transmit aggregated user profile data associated with the end users who consume the electronic information. When an end user requests information, the metering process 36 associates the information with the aggregated user profile data of the user in the user profile database 30. The metering server 14 then sends the user profile data to the clearinghouse server 20 which compiles the data.

Figure 5:
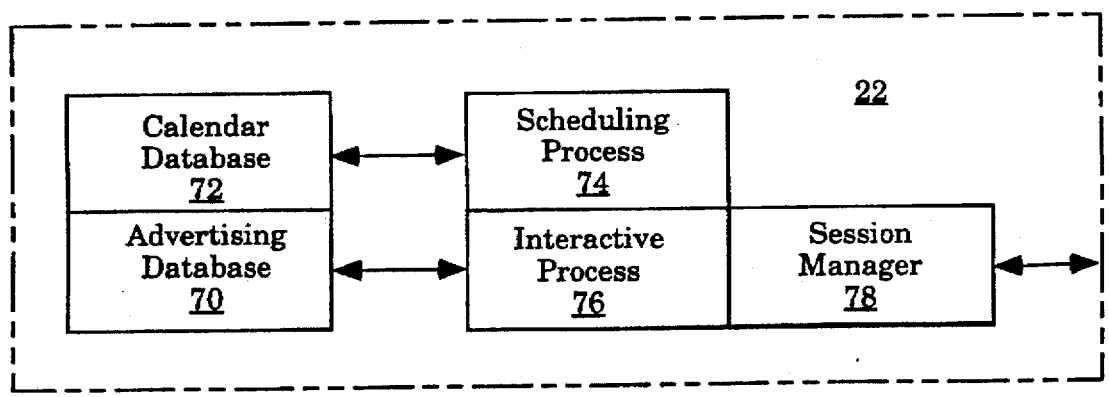
FIG. 5 is a schematic of a yellow page server in one embodiment of the present invention.

As shown in FIG. 5, the yellow page server 22 contains a resident advertising database 70, a calendar database 72, a scheduling process 74, an interactive process 76 and a session manager 78. The yellow page server 22 receives and stores electronic advertising information from an advertiser 18 in the advertising database 70. The advertising database 70 may contain electronic information that is generated by advertisers or by the end users. By way of example, an end user generated electronic advertisement may be analogous to a "classified ad". To create end user generated advertisements, the client systems may be provided with the same electronic publishing tools as the advertiser. The electronic advertising information typically includes advertising titles. The electronic advertising information may also have header information containing targeted user profile data. The metering process 36 accesses the user profile databases and correlates the targeted user profile data with metering servers that service end users with the targeted profiles. Metering servers with corresponding target profiles are provided with the advertising titles.

The calendar database 72 contains advertiser's scheduling and availability information. For example, an end user/advertiser may generate an advertisement that specifies a service such as lawn mowing. The end user/advertiser may also include an availability schedule within the calendar database 72 which allows an end user who consumes the advertisement to view and request the service at a specified date and time. The scheduling process 74 allows the end user to access the calendar database 72 to view and schedule a time, etc.

Each client system 12 may have a running cooperative process that provides the advertising information to the end user. The GUI of the client system may provide a visual or audio indication that an advertising title has been received by the end user computer. The end user can then review the advertising title and request the electronic advertisement if desired. The metering server then retrieves the electronic advertisement from the yellow page server for subsequent transmittal to the end user. Although an electronic advertisement has been described, it is to be understood that a unit of electronic information from a publisher may also be distributed to the client systems 12 in this manner.

Alternatively, the end user may initiate a request of an advertising content database 70 such as a "yellow pages" which is stored in the advertising database of the yellow pages server 22. The interactive process 76 allows the end user to search and view advertisements from a library(s) of ads. The interactive process 76 may allow the end user to answer queries and take alternate paths to external databases. The interactive model may also allow the end user to initiate a query with the advertiser requesting follow-up information.

The metering server 14 in conjunction with the client activity monitor 24 of the client system may monitor the end user's consumption of electronic advertising information and provide user profile data to the metering server 14 relating to the end user. For example, the metering process 36 may monitor the amount of time an end user spends viewing an electronic advertisement, or which particular advertisement or page of the advertisement was of interest to the end user. The metering process 36 may further monitor what answers were provided by the user, or paths taken by the user in an interactive model, along with follow-up requests initiated by the end user in an interactive model. This information is then forwarded to the clearinghouse server 20 for compilation.

In addition to the monitoring taking place at the metering server 14, a finer granularity monitoring process takes place at each client system 12, as described above. The results of this monitoring at each client system 12 is encoded and stored for that consumer in the personal profile database 27 of the client system 12.

Figure 6A:
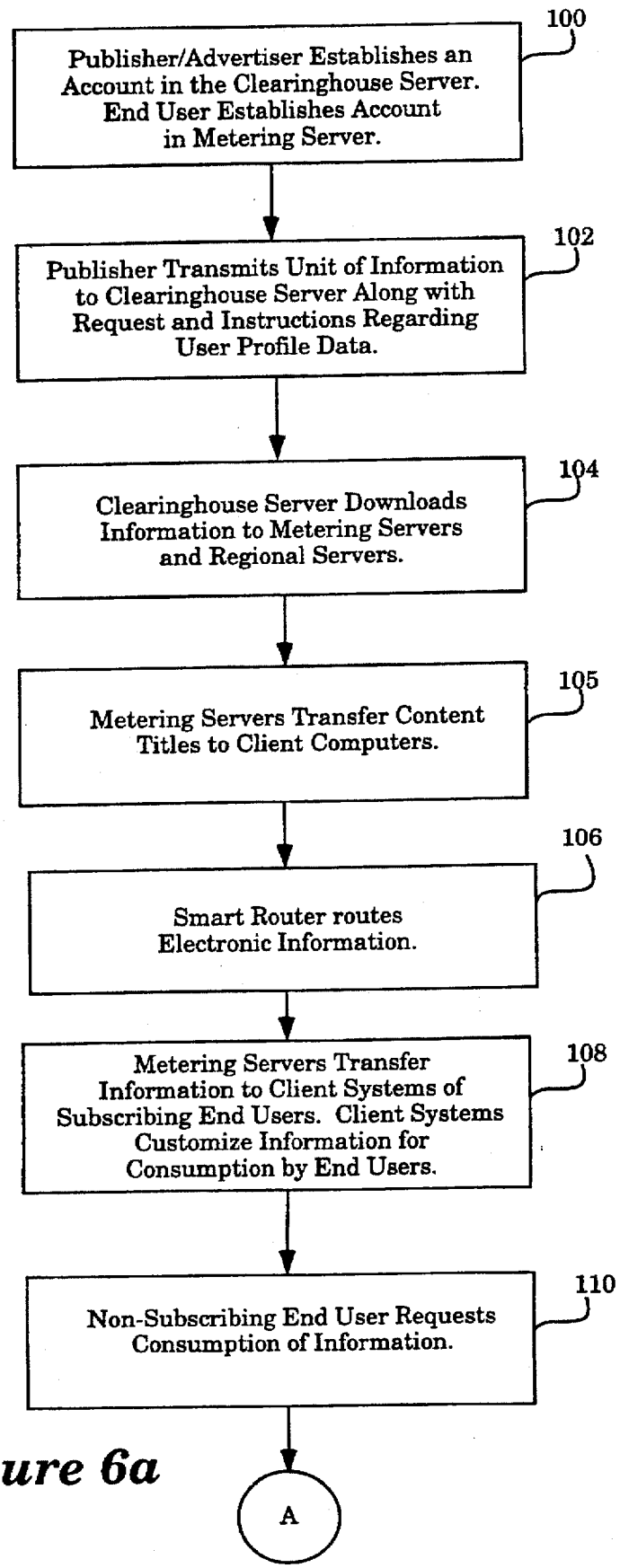
FIGS. 6a and 6b are flow diagrams that show a unit of information consumed by an end user according to one embodiment of the present invention.
Figure 6B:
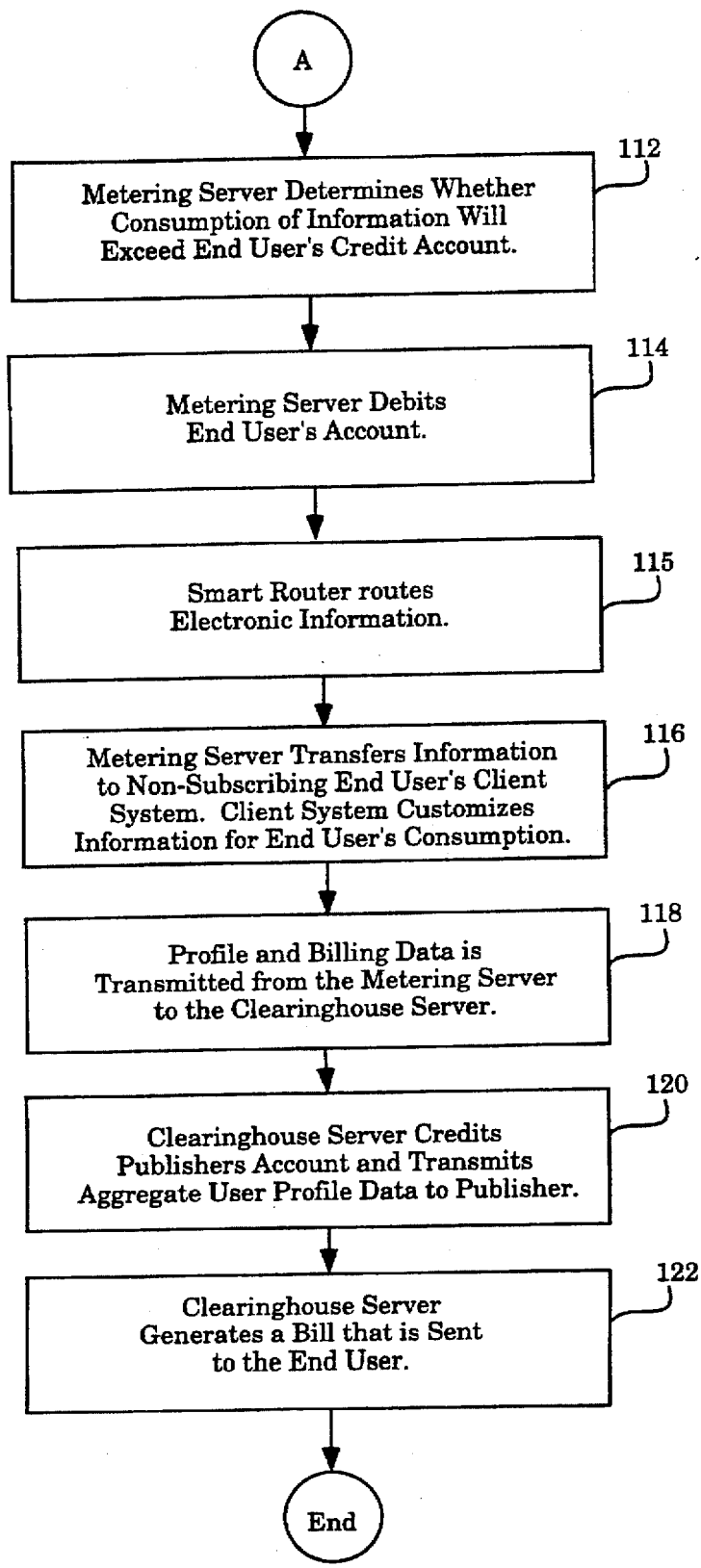

FIGS. 6a and 6b provide an example of a publisher supplying information that is consumed by the end user. As shown in processing block 100, both the end user and the publisher have established account numbers that are stored in the clearinghouse 20 and metering 14 servers. By way of example, the publisher may be a newspaper entity that has a content database which contains text, graphics and video. In block 102, the publisher 18 transfers a unit of electronic information relating to a news story to the clearinghouse server 20. The electronic information has an associated title that summarily describes the contents of the information. The unit of electronic information also contains a cost type and a cost value. In this example, the cost type includes both subscription and pay per view. The pay per view will have an associated cost value. The unit of information also requests profile data relating to the end users who consume the pay per view information. Additionally, the unit of electronic information provides target user profile data to direct the electronic information to end users who have correlating profile data, as well as information on the minimum and maximum required bandwidth for each media types contained in the electronic content and the amount the publisher/advertiser 18 is willing to pay to obtain delivery of the media type on a transport mechanism (channel link) satisfying the given minimum and maximum bandwidth/cost requirements.

In block 104, the clearinghouse server 20 downloads the unit of electronic information to the regional 21 and metering 14 servers which service end users that are subscribers or have qualifying profile data. In block 105, the metering servers 14 transfer the content titles of electronic information to the client systems 12. For end users that are not subscribers, the metering server 14 may also provide an indication of the cost of viewing the information.

In block 106, the smart router 31 of metering servers 14 looks at the labels in the header associated with the content as well as the channel links provided between the metering servers 14 and the consumption device 12. If there is only one communication link, then the metering servers 14 transmits electronic information over that communication link to the consumption device 12, charges the consumer for the consumption and charges the author for the storage and distribution. If there are two or more communication links, the smart router 31 determines which channel links are available and what the provider of the communication link is charging per unit of information sent per unit of time. For example, the charge may be a fraction of a cent for a megabyte of information or a byte of information transmitted within a period of time.

Once the smart router 31 has determined the cost associated with each of the available communication channels, it looks into the header block of the electronic content and extracts the fields that are relevant to the distribution between the metering servers 14 and the consumption device 12. The relevant fields in this case are how much the publisher is willing to pay for a given channel link and what the desired bandwidth requirements are for the distribution of a particular content. The smart router 31 then performs the best fit operation given the fields that are extracted to the channels that are available. The smart router 31 then extracts the electronic information from a temporary storage if the electronic information resides on the metering servers 14 or requests the electronic information from the yellow pages server 22 or the content server and transmits the information to the consumption device 12.

In block 108, the metering servers 14 transfer the contents of the information to the client systems of end users that are subscribers. If the contents do not reside in the metering server 14, the contents are typically retrieved from the regional content database server 21. The client systems customize the contents of the information for consumption by the individual end users. For example, the colors of particular fields in the information may be changed, based on the individual end user's preference. In addition, one of the formats the contents of the information is received in, such as text or video, may be selected by the client system for consumption by the individual end user, based on the individual end user's preference.

A non-subscribing end user may request consumption of the electronic information in block 110. In block 112, the metering server 14 determines if the price of viewing the information exceeds the balance of the user's credit account. In block 114 the end user's account is debited an amount equal to the price of viewing the information. In block 115, the smart router 31 routes the electronic information. If the account balance is not exceeded by the purchase of electronic information, the contents are transferred to the client system of the end user and are customized to the end user by the client system in block 116.

In block 118, the metering server 14 sends the profile data requested by the publisher 18 and the billing information to the clearinghouse server 20. The clearinghouse server 20 credits the publisher's account and transfers the profile data to the publisher in block 120. In block 122, the clearinghouse server generates a bill that is sent to the end user.

Figure 7A:
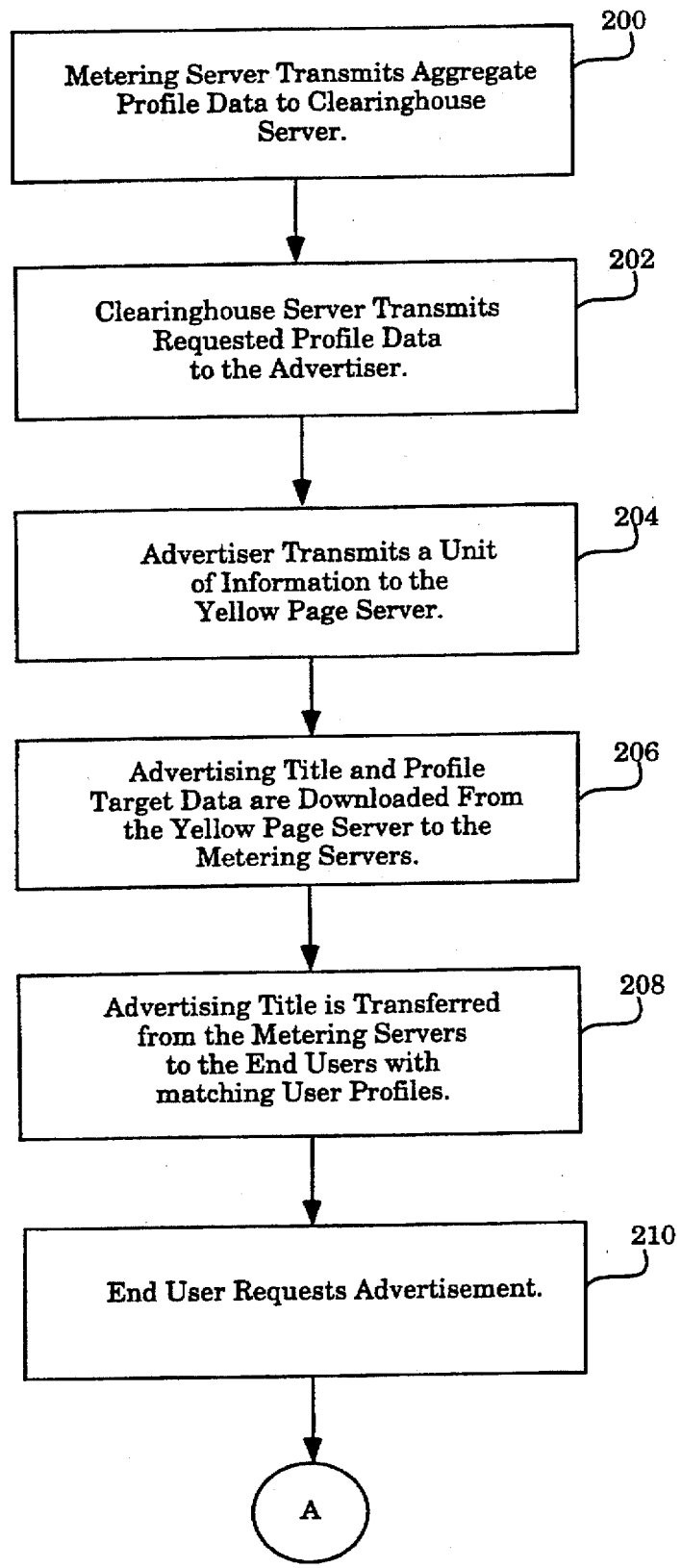
FIGS. 7a and 7b are flow diagrams that show an electronic advertisement consumed by an end user according to one embodiment of the present invention.
Figure 7B:
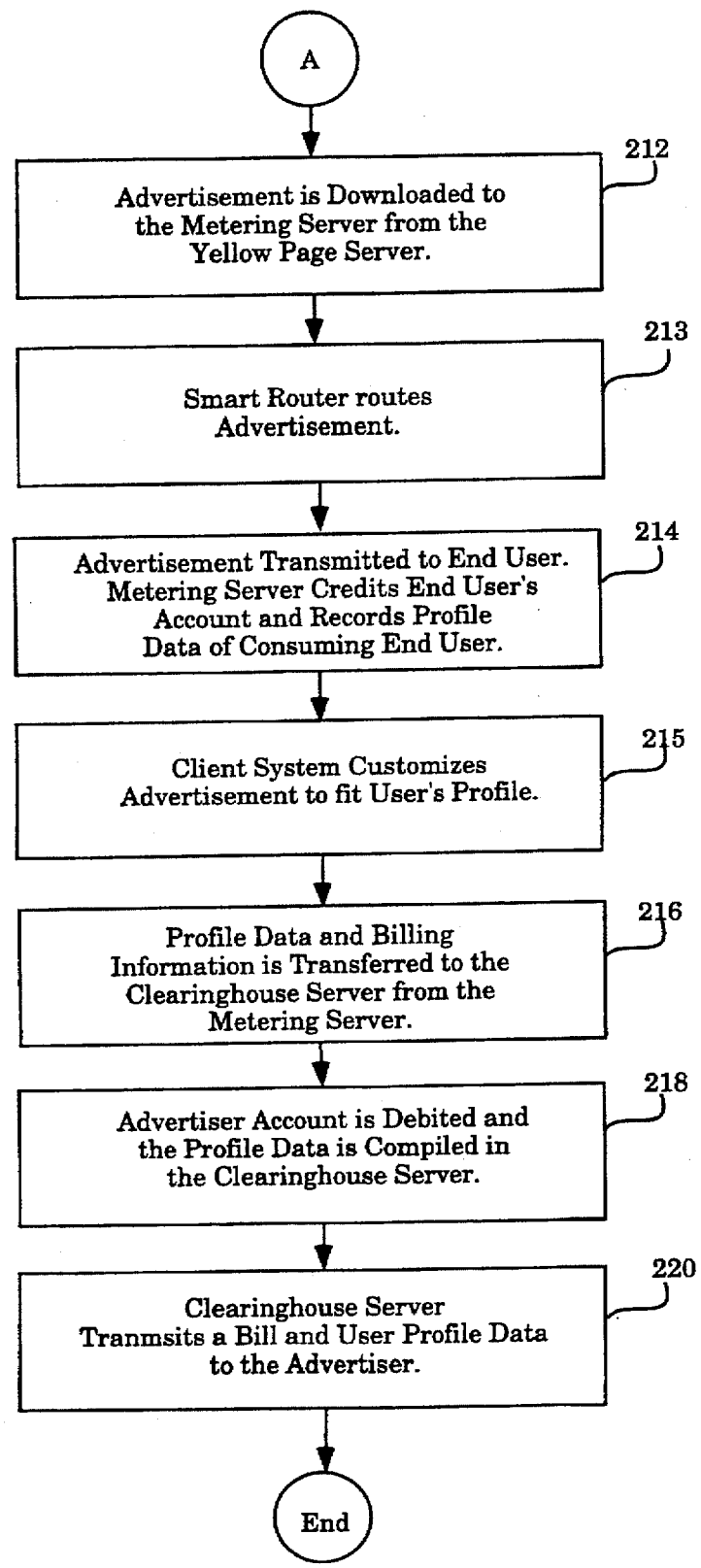

FIGS. 7a and 7b provide an example of an end user viewing an advertisement. In processing block 200, profile data of the end users is transferred from the metering server 14 to the clearinghouse server 20. The clearinghouse server 20 transmits requested profile data to the advertiser 18 in block 202.

In block 204, the advertiser 18 transmits a unit of information to the yellow page server 22. The unit of information contains an advertisement, advertisement title, desired or most valuable user profile characteristics for targeting end users and minimum/maximum bandwidth requirement of each multimedia types associated with the advertisement as well as the amount the advertiser 18 is willing to pay for each transport mechanism used. The advertising title, profile target data and bandwidth/cost parameters are downloaded to the metering servers 14 by the yellow page server 22 in block 206. The metering servers 14 then provide the advertisement title to end users who have profile characteristics that correlate with the targeted profile data in block 208. In one implementation, the client systems 12 customize the advertisement title to their individual end users.

The end user requests the advertising information in block 210. In block 212, the metering server 14 requests the advertisement from the yellow page server 22, which downloads the advertisement information to the metering server 14.

In block 213, the smart router 31 looks at the available transport mechanisms as well as the minimum bandwidth requirement parameter and the cost parameter associated with the advertisement. The smart router 31 then performs a best fit given the available transport channels, the minimum bandwidth requirement and the cost parameters associated with the advertisement. In block 214, the metering server 14 transfers the advertisement to the client system of the end user via the transport mechanism(s) selected by the smart router 31. The metering server 14 then credits the end user's account and records the profile data of the end users who requested the advertisement. In block 215, the client system 12 customizes the advertisement for consumption by the end user.

In block 216, the profile data and billing information are transferred from the metering server 14 to the clearinghouse server 20. The profile data is compiled and the advertiser's account is debited in block 218. In block 220, the clearinghouse server 20 generates and provides the advertiser 18 with a bill and the profile data of the end users who viewed the advertisement.

Figure 8:
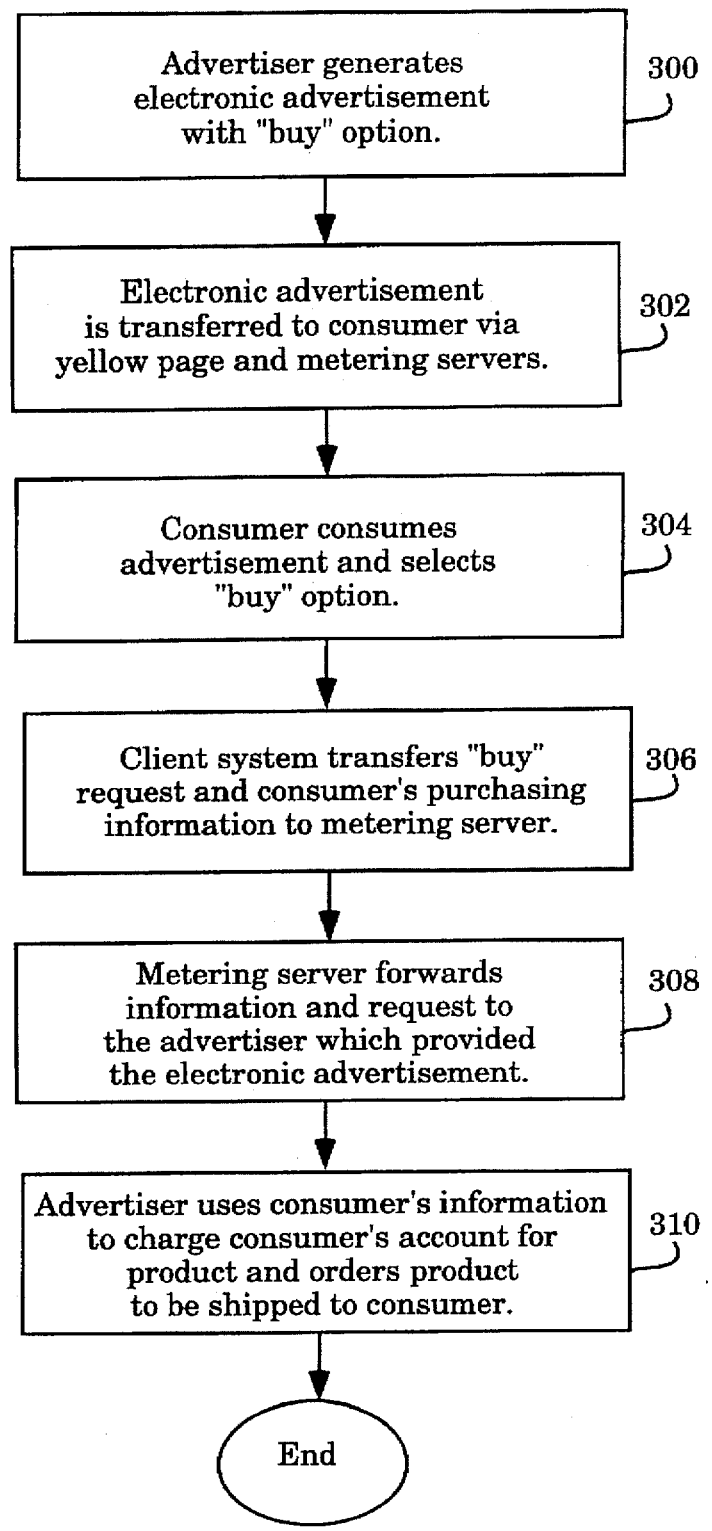
FIG. 8 is a flow diagram that shows an electronic advertisement being provided to a consumer who purchases the advertised product.

FIG. 8 provides an example of providing an electronic advertisement to a consumer who purchases the product. In block 300, an advertiser 18 generates an electronic advertisement for a product having a "buy" option. The electronic advertisement is then transferred to the consumer, via the yellow page 22 and metering 14 servers, block 302. In block 304, the consumer consumes the electronic advertisement and selects the "buy" option. The "buy" option may be, for example, a predetermined area of the advertisement displayed to the consumer with the word "purchase" written in the area or a graphic symbol such as a credit card or dollar sign.

In block 306, the client system 12 collects the consumer's purchasing information, as stored in the personal profile database 27, and transfers the information and the "buy" request to the metering server 14. The metering server 14 then forwards the information and "buy" request to the advertiser 18 which provided the advertisement, block 308. The request may be sent directly to the advertiser 18, or alternatively, to the advertiser 18 via a yellow page server 22. In block 310, the advertiser 18 uses the consumer's information to charge the consumer's credit account for the product and orders the product to be shipped to the consumer. The credit account to be charged is indicated in the personal profile database 27 by the end user. This could be the user's credit account for the system 10 as stored in the clearinghouse server 20, or, alternatively, a credit card account number.

Figure 9:
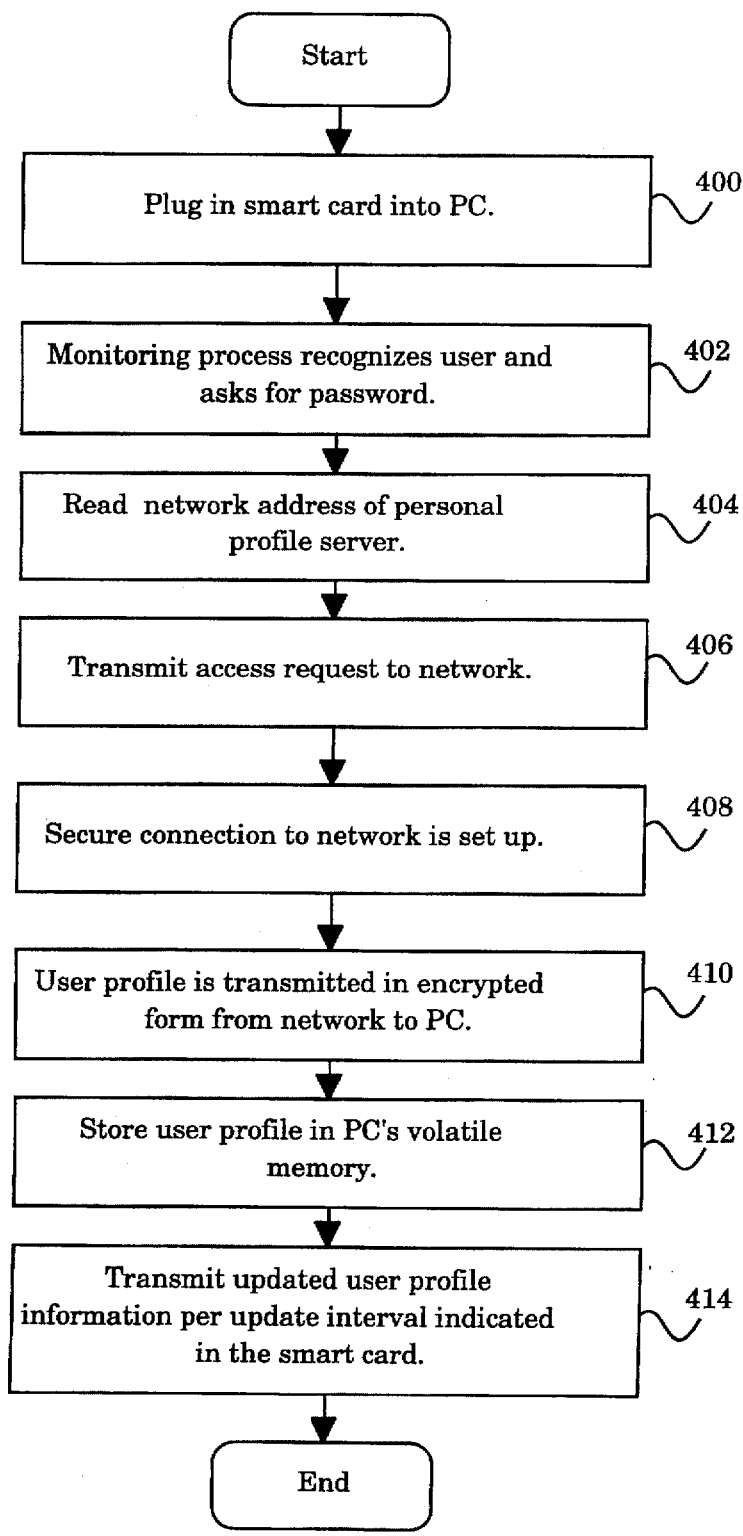
FIG. 9 is a flow diagram illustrating the general steps followed in an embodiment of the present invention using a smart card.

In one embodiment where the personal profile information is stored in a removable personal profile storage device, more specifically a smart card, the general steps illustrated in the flow chart of FIG. 9 may be followed. In step 400, a user inserts a smart card into a PC (a client consumption device 12). In step 402, the monitoring process reads the smart card, and prompts the user for their password. In step 404, the client consumption device 12 reads the network address of the personal profile server off of the smart card. In step 406, the client consumption device 12 then transmits an access request to the network. This request is encrypted and authenticated. When the request reaches the personal profile server which is hosting the user personal profile, the password is read and verified. The user personal profile is then pulled out of the encrypted storage on the personal profile server and the authentication mechanism is put in place. A secured connection to the network is set up in step 408.

In step 410, the retrieved user personal profile is transmitted in encrypted form from the personal profile server in the network 10 to the client consumption device 12. In step 412, the transmitted user profile information is stored in the client consumption device 12's volatile memory. In step 414, an updated user profile information is transmitted back to the network system 10 at intervals indicated by the updated interval field stored in the smart card.

Figure 10:
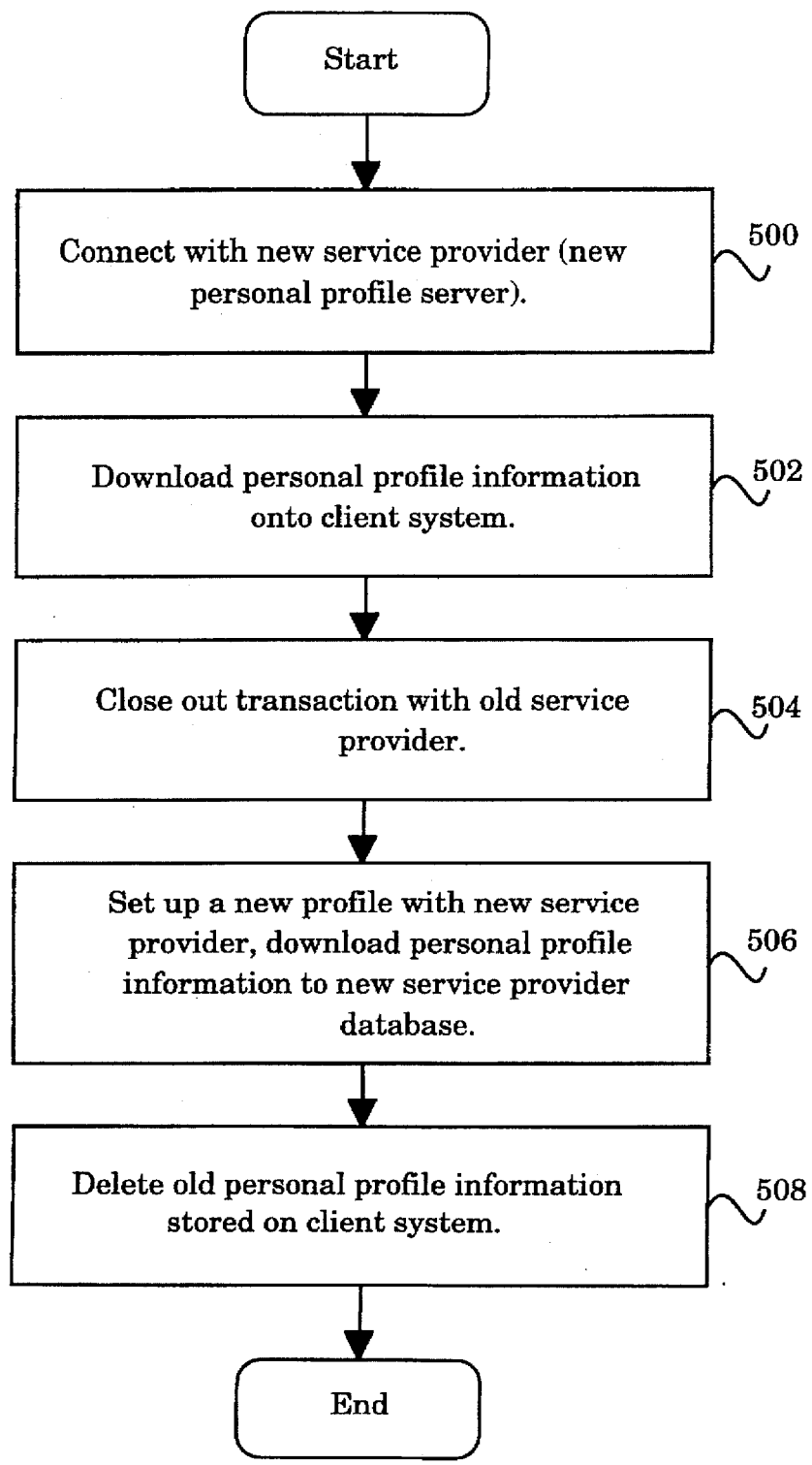
FIG. 10 illustrates the general steps followed by the present invention in allowing a user to change the residence of their personal profile server.

FIG. 10 illustrates the general steps followed by the present invention in allowing a user to change the residence of their personal profile server. In step 500, the client consumption device 12 connects with a new service provider (new personal profile server) by using a public key to set up a secure connection. In step 502, the personal profile information is downloaded from the old service provider onto the client system 12. In step 504, the client consumption device closes out its transaction with its old service provider. In step 506, the personal profile information temporarily stored on the client system is transmitted to the new service provider to set up a new profile. In step 508, the old personal profile information stored on the client system is deleted.

Thus, the method and apparatus of the present invention provides individual end users with high quality electronic information while preserving the end users' privacy. The user profile data corresponding to individual end users is stored in the client systems of those end users. Statistics regarding the psychographic, demographic and other profile characteristics of these users is returned to publishers and advertisers, however the information returned to these publishers and advertisers has no information to identify the identity of the end users. Thus, publishers and advertisers are able to provide the type of electronic information that end users want, thereby providing high quality electronic information. In addition, the client systems which the individual end users utilize are able to customize the electronic information to the individual end users based on the user profile data stored in the client systems.

A portion of the user profile data may be stored in a smart card. In this implementation, the remainder of the user profile data is stored in a personal profile server. The client system retrieves the relevant user profile data from the profile server as necessary. User profile data changed during use on the client system is transmitted to the profile server as updates.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

What is claimed:

1. A method for storing and updating electronic information in a personal profile server for an individual user, and dynamically changing the residence of the electronic information, said electronic information being transmitted between a computer and a network system including said personal profile server, comprising the steps of:

interfacing the computer with a removable non-volatile storage device containing minimum user information on the individual user including information identifying the individual user;

securing connection between the computer and the network using said minimum user information;

transmitting additional user information from said personal profile server of the network to the computer, said additional user information including the individual user's electronic consuming habits; and automatically updating the personal profile server with updates to said additional user information gathered from monitoring the individual user's electronic consuming habits generated on the computer during use.

2. The method of claim 1 wherein said step of transmitting further comprises the step of storing said additional user information transmitted from said personal profile server in the computer's volatile memory.

3. The method of claim 1 wherein said step of updating further comprises the step of transmitting updated said additional user information to said personal profile server at update intervals indicated in a field stored in said removable non-volatile storage device.

4. The method of claim 1 wherein said step of interfacing further comprises the step of transmitting an access request to the network using a user password stored in said removable non-volatile storage device, said user password being part of said minimum user information.

5. The method of claim 1 wherein said step of securing further comprises the step of downloading said additional user information from said personal profile server of the network to the computer if said user password allows access to the individual user's personal profile.

6. The method of claim 5 further comprising the step of changing the residence of said additional user information on said personal profile server.

7. The method of claim 6 further comprising the step of connecting to a new personal profile server.

8. The method of claim 7 further comprising the step of downloading said updated additional user information from old personal profile server onto the computer.

9. The method of claim 8 further comprising the step of setting up a new additional user information with said new personal profile server by downloading said updated additional user information to said new personal profile server.

10. The method of claim 9 further comprising the step of deleting old updated additional user information stored on said computer.

11. An apparatus for storing and updating electronic information in a personal profile server for an individual user, said apparatus being capable of dynamically changing the personal profile server on which said electronic information is stored, the electronic information being transmitted between a computer and a network including said personal profile server, said apparatus comprising:

a personal profile database which stores consumer information corresponding to the individual user including the individual user's electronic consuming habits;

a content adapter coupled to the personal profile database which customizes the electronic information to the individual user according to the consumer information stored in the personal profile database;

a client activity monitor coupled to the personal profile database which monitors actions taken by the individual user and automatically updates the personal profile database and the personal profile server with updated individual user's electronic consuming habits based on the individual user's electronic consuming habit generated on the computer during use; and a removable non-volatile storage device couplable to the computer and containing minimum user information including information identifying the individual user and allowing a secure access and interface from the computer to additional user information on the personal profile server, said additional user information including the individual user's electronic consuming habits.

12. The apparatus of claim 11 wherein said removable non-volatile storage device comprises of a smart card.

13. The apparatus of claim 11 wherein said user information further comprises of a user password and a user identification number.

14. The apparatus of claim 11 wherein the computer comprises a volatile memory in where said additional user information temporarily stored while the computer and the network are interfaced.

15. A system for storing and updating electronic information in a personal profile server for an individual user, said system being capable of dynamically changing the personal profile server on which said electronic information is stored, the electronic information being transmitted between a computer and a network including said personal profile server, comprising:

an electronic information server containing a plurality of electronic information units; and a client system coupled to the electronic information server which receives the electronic information units from the electronic information server, wherein the client system includes, a personal profile database which stores user information corresponding to the individual user including the individual user's electronic consuming habits, a content adapter coupled to the personal profile database which customizes the received electronic information units to the individual user according to the user information stored in the personal profile database, the user information and the personal profile server being automatically updated with changes in the individual user's electronic consuming habits based on individual user's electronic consuming habits generated on the computer during use, and a removable non-volatile storage device couplable to the computer and containing minimum user information including information identifying the individual user and allowing a secure access and interface from the computer to additional user information on the personal profile server, said additional user information including the individual user's electronic consuming habits.

16. The system of claim 15 wherein said removable non-volatile storage device comprises of a smart card.

17. The system of claim 15 wherein said removable non-volatile storage device stores user information identifying a user and providing secure access to the network.

18. The system of claim 17 wherein said user information further comprises of a user password and a user identification number.

19. The system of claim 15 wherein the computer comprises a volatile memory in where said additional user information temporarily stored while the computer and the network are interfaced.

* * * * *